Aug. 30, 1927.
E. M. BALLOT
1,640,919
BRAKING DEVICE FOR VEHICLES
Filed Oct. 18, 1924
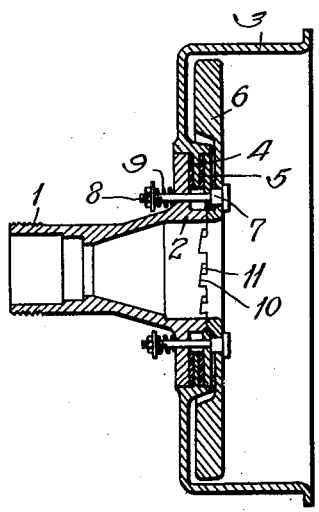
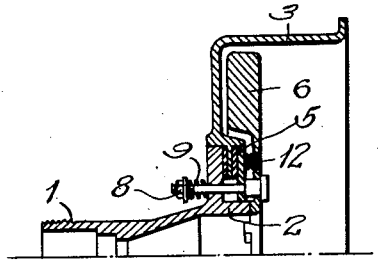
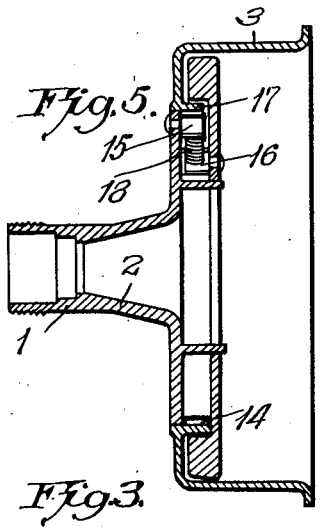
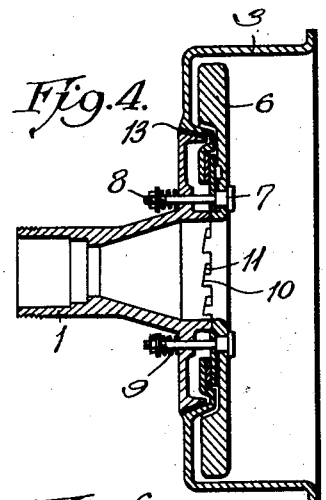
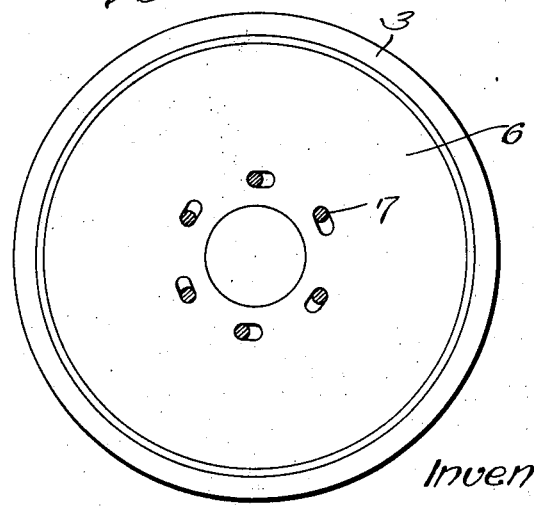
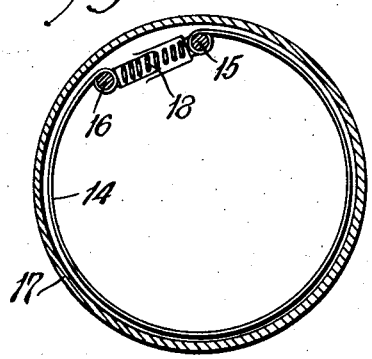
Inventor
Ernest M. Ballot,
By William C. Linton
Attorney.

Patented Aug. 30, 1927.

1,640,919

UNITED STATES PATENT OFFICE.

ERNEST MAURICE BALLOT, OF PARIS, FRANCE.

BRAKING DEVICE FOR VEHICLES.

Application filed October 18, 1924, Serial No. 744,360, and in France October 22, 1923.

The present invention has for its object to provide for the maximum braking of a vehicle irrespectively of its speed and adhesion to the ground, while at the same time the wheels will not be stopped under an excessive effort which may be exercised either by the driver or by a relay brake.

The said invention consists essentially in interposing between the brake drum and the wheels a suitable clutching device which is placed under the control of a flywheel, the latter being drawn forward by the rotation of the vehicle wheels in such manner that the said clutch will become inoperative when the tangential force of inertia of the flywheel relative to the vehicles shall attain a determined value.

The appended drawings which are given by way of example show various embodiments of the invention.

Figure 1 is a vertical section the hub of a wheel and brake drum thereof illustrating one form of the invention, Figure 2 is a similar view illustrating another form of the invention, Figure 3 is a front elevation of the brake drum illustrating the fly wheel and the connecting bolts being in section, Figure 4 is a view similar to Figure 1 showing another form of the invention, Figure 5 is another vertical section similar to Figure 1 of still another slightly modified form of the invention and Figure 6 is a detail sectional view of the same.

In the form of construction shown in Fig. 1, 1 is the wheel hub. The latter is provided near the inner end with a flange 2 cast in one therewith; upon the said flange is loosely mounted a drum 3 provided at the central part with a cheek 4 which is held between the said flange on one side and the disc 5 on the other. The said disc which is centered upon the hub is secured by the bolts 7 which engage a flywheel 6 and the flange 2, upon which they are caused to bear by means of the nuts 8 and the springs 9.

The central portion of the flywheel 6 is provided on one side with the ramps 10 engaging the recesses 11 which are formed in the inner end of the hub 1. It is observed that the bolts 7 are enabled to move in the lengthwise direction with reference to the axis of the wheel; the holes provided for the said bolts in the flywheel are elongated so that the said bolts are allowed a slight angular displacement.

The operation is as follows:

In normal conditions of travel, the drum 3 and hub 1 are coupled together by means of the springs 9 which afford between the flange 1, the cheek 4 and the disc 5 the friction which is necessary for the clutching. In this manner the whole device will rotate with the wheel without any relative motion of the several parts. Should the brakes be thrown with force, and if the adhesion to the ground is insufficient, the wheel has a tendency to be held fast, but in this event the flywheel 6 under the action of its force of inertia in the tangential direction, will continue to rotate. The ramps 10 will slide in the recesses 11, thus separating the said flywheel from the disc 5, so that the effect of the said springs will be diminished the said drum is made loose, and the brake shoes or like elements acting thereon will no longer affect the wheel, and the latter will begin to rotate. The flywheel returns to the original position, thus approaching the said disc, and the springs now resume their action; the clutching is at once effected, ensuring another stage of braking, and so on.

In Fig. 2, the device may be provided, in addition to the springs 9 disposed between the flywheel and the hub, with additional springs 12 which are compressed between the said flywheel and the clutch disc, the said springs, whose action is practically independent of the position of the flywheel, exercise pressure upon the clutch even when the effect of the springs 9 is annulled by the said flywheel, and the friction thus produced will exercise a retarding action which is imparted to the wheel.

The constructional form shown in Fig. 4 relates to a braking device analogous to what has been described, but wherein the drum 3 which is not provided with cheeks 4 is mounted upon a tapered portion 13 situated at the periphery of the flange 2.

The operation is the same as above set forth.

Figs. 5 and 6 relate to an arrangement in which the clutching is performed by means of a flexible strip; the latter which is shown at 14, is connected at one end to an arm 15 secured to the flange 2 and at the other to a second arm 16 secured to the flywheel 6. The drum 3 is provided with an annular wall 17 upon whose inner face is caused to bear the strip 14. A spring 18 is interposed between the arms 15 and 16 which are thus held apart. In normal operation, the strip 14 is strongly pressed against the wall 17 and thus provides for the clutching of the drum 3 and the hub 1. In the event of a sudden braking, the flywheel which is entrained by its kinetic energy will compress the spring 18, thus reducing the diameter of the circle formed by the strip 14 whereby the drum 3 will be disengaged.

In the drawings, the invention is shown as adapted to all cases to brake drums which are mounted upon the wheels, but it is also adapted for brakes acting upon the power transmission devices, in which event the flywheel is actuated by a suitable element of the transmission device.

I claim:

1. A vehicle brake comprising a brake drum, a vehicle wheel having a hub, an annular flange formed near the inner end of said hub, a clutch for connecting at times said flange and said brake drum, a flywheel arranged in proximity to the inner end of said hub, and having projecting portions thereon adapted to coact with portions of the hub, and means connecting said flywheel with said clutch, whereby limited rotary motion of said flywheel in respect to said hub will cause disengagement of said clutch.

2. A vehicle brake comprising in combination, a drum, a wheel hub, clutching elements for connecting said drum to said hub, a fly wheel controlling the operation of said elements and a connection between the fly wheel and said hub whereby under predetermined conditions said fly wheel will have lateral movements for controlling the action of said elements.

3. A vehicle brake comprising in combination, a drum, a wheel hub, clutch elements for connecting said drum to said hub, a fly wheel controlling the engaging action of said elements, springs maintaining at all times a predetermined pressure between the elements, and a connection between the fly wheel and said hub whereby the rotatable action of said fly wheel may be utilized to give lateral movement to the fly wheel thereby controlling the action of said elements.

4. A vehicle brake comprising in combination a wheel hub having a circular cheek, a drum having a cheek for engaging the first cheek, a fly wheel, means connected to said fly wheel and hub for yieldably holding said cheeks in frictional engagement and cam connections between said fly wheel and hub whereby said cheeks may be variably relieved by the action of said fly wheel.

In witness whereof I affix my signature.

ERNEST MAURICE BALLOT.